United States Patent
Bernheim et al.

(10) Patent No.: US 7,173,915 B2
(45) Date of Patent: Feb. 6, 2007

(54) SYSTEM AND METHOD FOR VIRTUAL SECTOR PROVISIONING AND NETWORK CONFIGURATION

(75) Inventors: Henrik F. Bernheim, Bellevue, WA (US); Andy E. Rostron, Everett, WA (US)

(73) Assignee: Harris Corporation, Melboure, FL (US)

( * ) Notice: Subject to any disclaimer, the term of this patent is extended or adjusted under 35 U.S.C. 154(b) by 536 days.

(21) Appl. No.: 10/183,490

(22) Filed: Jun. 28, 2002

(65) Prior Publication Data

US 2003/0012208 A1    Jan. 16, 2003

Related U.S. Application Data

(63) Continuation-in-part of application No. 09/893,441, filed on Jun. 29, 2001.

(51) Int. Cl.
*H04L 12/28* (2006.01)
*H04L 12/56* (2006.01)

(52) U.S. Cl. .................. 370/328; 370/407; 455/62

(58) Field of Classification Search .............. 370/310, 370/310.1, 315, 319, 321, 323, 325, 326, 370/328, 329, 330, 336, 337, 338, 342, 345, 370/347, 407; 455/62, 63, 65, 272, 277.1, 455/277.2, 278.1, 446, 561, 562
See application file for complete search history.

(56) References Cited

U.S. PATENT DOCUMENTS

| | | | |
|---|---|---|---|
| 5,513,343 A | | 4/1996 | Sakano et al. |
| 5,559,883 A | * | 9/1996 | Williams .................... 713/201 |
| 5,675,735 A | * | 10/1997 | Gallagher et al. .......... 709/228 |
| 5,729,472 A | | 3/1998 | Seiffert et al. |
| 5,787,409 A | | 7/1998 | Seiffert et al. |
| 5,809,253 A | * | 9/1998 | Gallagher et al. .......... 709/228 |
| 5,838,681 A | * | 11/1998 | Bonomi et al. ........ 370/395.41 |
| 5,864,854 A | * | 1/1999 | Boyle .......................... 707/10 |
| 5,872,779 A | * | 2/1999 | Vaudreuil ................... 370/352 |
| 6,011,795 A | * | 1/2000 | Varghese et al. ............ 370/392 |
| 6,012,152 A | | 1/2000 | Douik et al. |
| 6,016,313 A | * | 1/2000 | Foster, Jr. et al. .......... 370/330 |
| 6,108,616 A | | 8/2000 | Borchers et al. |
| 6,108,702 A | * | 8/2000 | Wood ......................... 709/224 |
| 6,304,762 B1 | * | 10/2001 | Myers et al. ............... 455/562 |
| 6,392,705 B1 | * | 5/2002 | Chaddha .................. 348/388.1 |
| 6,393,290 B1 | * | 5/2002 | Ufongene ................... 455/446 |
| 6,512,754 B2 | * | 1/2003 | Feder et al. ................ 370/338 |
| 6,546,003 B1 | * | 4/2003 | Farris ......................... 370/352 |
| 6,754,757 B1 | * | 6/2004 | Lewis ......................... 710/301 |

* cited by examiner

*Primary Examiner*—Huy D. Vu
*Assistant Examiner*—Roberta A. Shand
(74) *Attorney, Agent, or Firm*—Duane Morris LLP (57) ABSTRACT

The present invention provides systems and methods wherein communication link redundancy may be provided which is optimized to the primary links. Specifically, a redundant link portion of a communication system may be deployed to provide redundant links for a primary link portion of the communication system having substantially greater information communication capacity. However, through the use of isolation of portions of the primary link capacity, such as through the preferred embodiment sectors, sufficient redundant link capacity may be maintained economically. According to a preferred embodiment, a single redundant sector may be coextensive with a plurality of primary sectors and, thus, be relied upon for providing redundant links for any such primary sector. Preferred embodiments allow for the subsectoring of primary sectors while maintaining the configuration of a redundant sector corresponding thereto.

18 Claims, 6 Drawing Sheets

SYSTEM AND METHOD FOR VIRTUAL SECTOR PROVISIONING AND NETWORK CONFIGURATION

RELATED APPLICATIONS

This application is a continuation-in-part of co-pending U.S. patent application Ser. No. 09/893,441 filed Jun. 29, 2001.

BACKGROUND

In the past, information communication between processor-based systems, such as local area networks (LAN) and other general purpose computers, separated by significant physical distances has been an obstacle to integration of such systems. The choices available to bridge the physical gap between such systems have not only been limited, but have required undesirable tradeoffs in cost, performance, and reliability.

One group of historically available communication choices includes such solutions as the utilization of a standard public switch telephone network (PSTN) or multiplexing signals over an existing physical link to bridge the gap and provide information communication between the systems. Although such solutions are typically inexpensive to implement, they include numerous undesirable traits. Specifically, since these existing links are typically not designed for high speed data communication, they lack the bandwidth through which to communicate large amounts of data rapidly. As in-building LAN speeds increase to 100 Mbps, the local PSTN voice grade circuits even more markedly represent a choke point for broadband metropolitan area access and therefore are becoming a less and less desirable alternative. Furthermore, such connections lack the fault tolerance or reliability found in systems designed for reliable transmission of important processor-based system information.

Another historically available group of communication choices is found at the opposite end of the price spectrum than those mentioned above. This group includes such solutions as the utilization of a fiber optic ring or point-to-point microwave communication. These solutions are typically cost prohibitive for all but the larger users. The point-to-point systems require a dedicated system at each end of the communication link which lacks the ability to spread the cost of such systems over a plurality of users. Even if these systems were modifiable to be point-to-multipoint, to realize the economy of multiple system use of some system elements, the present point-to-point microwave systems would not provide broadband data services but rather traditional bearer services such as T1 and DS3. Furthermore these systems typically provide a proprietary interface and therefore do not lend themselves to simple interfacing with a variety of general purpose processor-based systems.

Although a fiber optic ring provides economy if utilized by a plurality of systems, it must be physically coupled to such systems. As the cost of purchasing, placing, and maintaining such a ring is great, even the economy of multi-system utilization generally does not overcome the prohibitive cost of implementation.

Accordingly, point-to-multipoint systems such as shown and described in above referenced U.S. Pat. No. 6,016,313, entitled "System and Method for Broadband Millimeter Wave Data Communication," have been developed to provide broadband communication infrastructure in an efficient and economical alternative. For example, a preferred embodiment point-to-multipoint system described in the U.S. Pat. No. 6,016,313 provides for a network of point to multipoint hubs to establish cellular type coverage of a metropolitan area. Such systems are generally more economical to deploy than systems such as fiber optic networks, due to their use of wireless links avoiding the cost of laying fiber to all nodes on the network, and point-to-point microwave, due to the sharing of resources among several or many users.

It is generally desirable for systems providing broadband data services to do so with a high level of reliability. For example, the fact that such a broadband communication system is adapted to carry data quickly suggests that a large volume of data is carried there through. However, systems such as the above referenced point-to-multipoint system may present a single point of failure, such as an antenna, a radio, or a modem, which may affect communications with respect to a number of subscribers. Accordingly, it may be desirable to provide for redundancy for one or more components. However, any such redundancy is preferably carefully implemented in order that the desired economies leading to selection of such a system architecture are not negated.

Moreover, systems providing data communication, such as in a SONET optical network, are often required to provide very reliable and high quality communications, such as providing error free communication 99.999% of the time (often referred to as "five nines"). Accordingly, it may be desirable to adapt broadband communication systems such as the aforementioned point-to-multipoint wireless communication systems to provide the same or similar high quality, reliable, communications, such as where the wireless systems are utilized to provide a communication link with or within a system otherwise providing communication to such a standard.

A need therefore exists in the art for systems and methods for providing a high level of communication system reliability through the use of redundant components. A further need exists in the art for such systems and methods to be adapted such that they are deployed and operated economically and yet may be relied upon to provide a desired level of service and date throughput. A still further need exists in the art for such systems and methods to be implemented with optimization of available spectrum utilization.

The present invention is directed to a system and method which is adapted to provide communication link redundancy for a plurality of primary communication links using a common redundant configuration. For example, according to a preferred embodiment, a single redundant link portion of a system is deployed to provide redundancy for a number of primary link portions of the system. According to the preferred embodiment, this single redundant link portion of the system is configured to conduct communications substantially commensurate with any one of the primary link portions of the system for which it is providing redundancy. Such a configuration allows a single redundant system portion, which generally remains idle during proper operation of the primary link system portions, to be relied upon to provide backup communications for a number of primary link system portions. Accordingly, the complexity and cost of a redundant link portion of a system may be reduced while still providing adequate backup for any one of the primary link system portions' failure.

Although a preferred embodiment redundant link portion of the system is configured to provide communications commensurate with only one of the primary link portions at a time, such a configuration is expected to provide adequate redundancy due to the unlikelihood of simultaneous failure at multiple ones of the plurality of primary communication links for which redundancy is being provided. To further aid in such a configuration being relied upon to provide adequate redundancy, the preferred embodiment uses modular components and/or is otherwise adapted to facilitate rapid repair of failing primary communication links, thereby further decreasing the likelihood of simultaneous failure at multiple ones of the plurality of primary communication links. Moreover, even where multiple such failures are experienced, the preferred embodiment redundant link portion of the system is adapted to provide communications for all such failed primary links, albeit at a reduced capacity.

According to a most preferred embodiment, the communication system for which communication link redundancy is provided is a sectored wireless communication system. According to this most preferred embodiment, sectors of the wireless communication system may each provide at least one primary communication link. A redundant link portion of a system adapted according to the present invention may provide link redundancy for a plurality of sectors. In a preferred embodiment, the communication system provides wireless communication between different computer networks, where any one or all of the different computer networks may be any one of the following: a public switched telephone network, a private branch exchange, a router, the internet, a private network, or a single computer.

According to an embodiment of the present invention, the multiple primary sectors, for which common structure is relied upon to provide redundancy, utilize different channel sets such as frequency division multiple access (FDMA) channels, time division multiple access (TDMA) channels, code division multiple access (CDMA) channels, and/or the like. Preferably, the redundant link portion of a system adapted according to the present invention provide link redundancy throughout each such sector using a unique channel set assigned thereto (whether FDMA, TDMA, and/or CDMA) so as not to substantially interfere with communications in ones of the sectors when relied upon to provide communications for a failed one of the sectors. Accordingly, preferred embodiment subscriber units, or other systems utilizing the communication links, are channel (i.e., frequency, time, code) agile so as to allow their operation both on a primary link channel set and a redundant link channel set.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention reference is now made to the following descriptions taken in conjunction with the accompanying drawing, in which.

DETAILED DESCRIPTION

Figure 1:
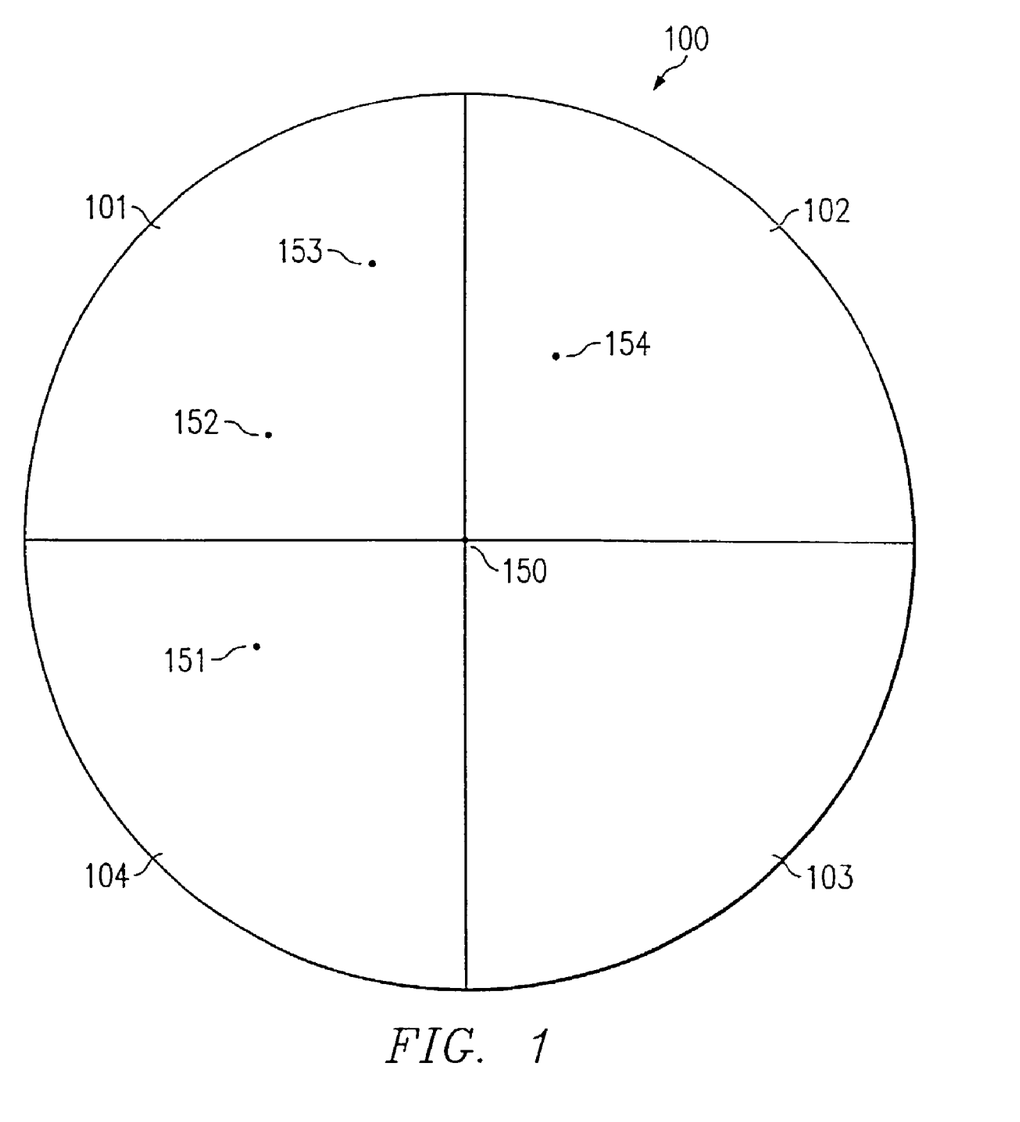
FIG. 1 shows a communication hub serving a plurality of nodes within a service area wherein link redundancy of the present invention may be deployed.

The present invention provides communication link redundancy for a plurality of primary communication links using a common redundant configuration. Directing attention to FIG. 1, a communication system adaptable according to the present invention is shown. Specifically, FIG. 1 shows a communication system in which communication hub 150 is in wireless communication with nodes 151–154 disposed in service area 100 in various ones of sectors 101–104. In a preferred embodiment, the hub 150 is operatively connected to one or more computer networks and each of the nodes 151–154 is operatively connected to one or more computer networks different than the computer networks to which the hub 150 is operatively connected. Preferably, the nodes 151–154 are attached to different computer networks.

It should be appreciated that, although a sectorized wireless communication is described herein with reference to operation of a preferred embodiment of the present invention, there is no limitation of the present invention to use of a system as illustrated in FIG. 1. One of skill in the art will recognize that the present invention is operable with any number of communication systems, whether wireless or wireline and whether sectorized or not, wherein a plurality of independent or individual communication links may be provided redundancy through common redundancy structure as taught herein.

Figure 2:
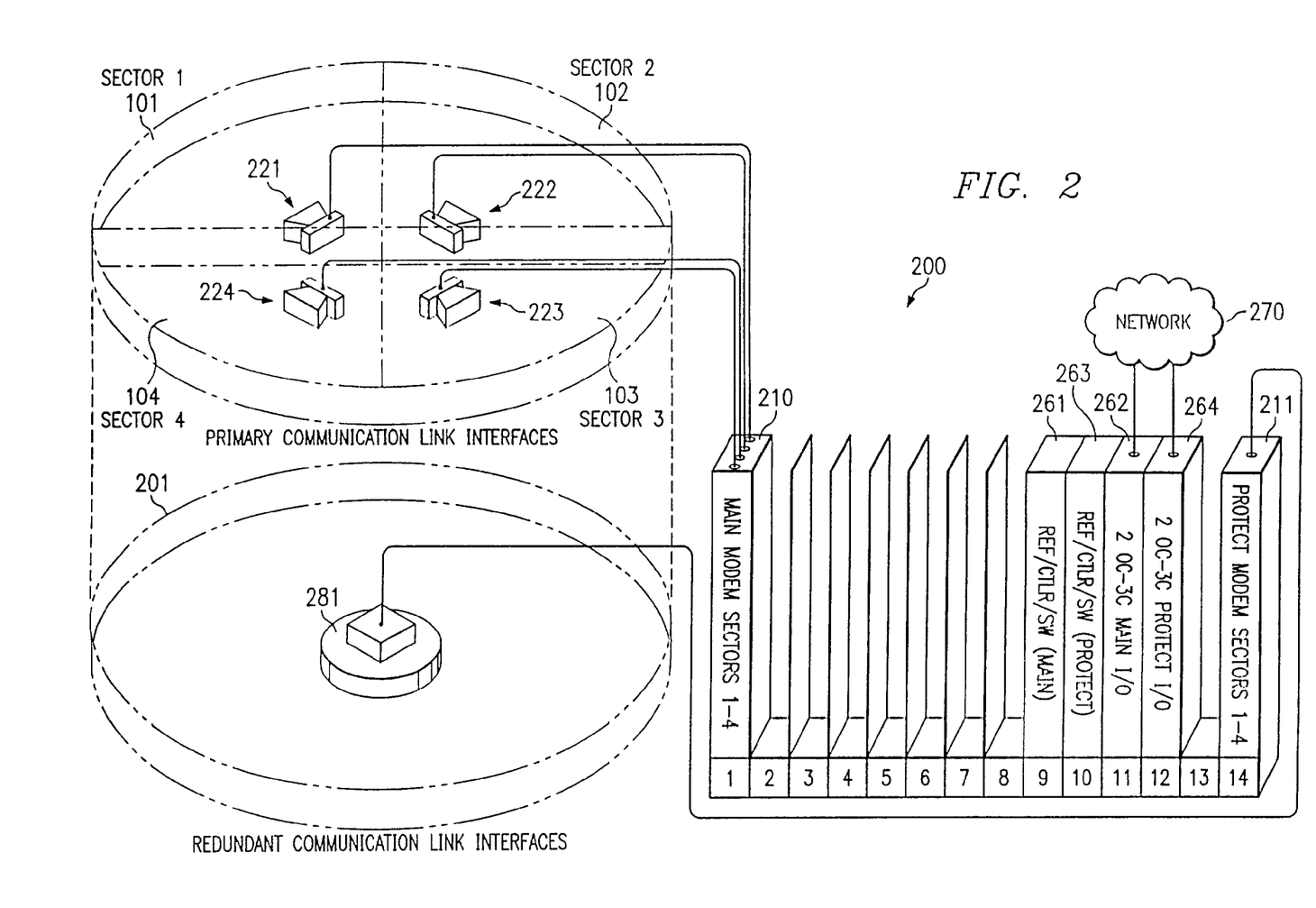
FIG. 2 shows a communication hub adapted to provide link redundancy according to an embodiment of the present invention.

Directing attention to FIG. 2, a preferred embodiment communication hub 150 adapted to establish communications within service area 100 is shown generally as communication system 200. In the illustrated embodiment of FIG. 2, communication hub 150 includes a communication signal processor, shown as multi-port modem 210, coupled to a plurality of communication interface modules, shown as radio modules 221–224. Radio modules 221–224 provide communications within sectors 101–104 respectively.

Accordingly, the antennas of radio modules 221–224 are preferably directional antennas having a predetermined beamwidth, such as 90° in the illustrated embodiment. By properly orienting each of radio modules 221–224, service area 100 may be defined as a 360° area around communication hub 150.

Various subscriber units, shown in FIG. 1 as remote nodes 151–154, disposed with service area 100 may be provided communication links through communication interface modules 221–224 and communication signal processor 210, such as to network 270 and/or systems coupled thereto. Nodes utilized according to the present invention may include an antenna coupled to a modem, such as through a front-end module converting between RF and IF frequencies, itself coupled to a customer premise equipment interface. However, it shall be understood that any number of component configurations are acceptable for use at nodes 151–154.

As shown in FIG. 2, a communication signal processor of the hub may be coupled to additional communications apparatus, such as a network interface, data router, and/or the like, shown in the preferred embodiment as switch 261 and input/output (I/O) 262, which may include controller logic, such as a processor (CPU), memory (RAM), and instruction set suitable for intelligently controlling communications between communication hub 150, nodes 151–154, and/or network 270. The hub may be provided external communications, such as to network service providers, communications carriers, subscriber units, additional communication hubs, and/or the like, such as through network 270 shown in the preferred embodiment. Network 270 may be any form of communication network, such as a public switched telephone network (PSTN), a local area network (LAN), a wide area network (WAN), the Internet, a cable communication system, a cellular network, a fiber optic network such as SONET or SDH, and/or the like.

It should be appreciated that communication hub 150 may be part of a larger communication network. For example, a plurality of communication hubs, possibly in communication through backbone links such as may be provided by network 270 and/or through the use of airlinks between the hubs, may be disposed throughout a metropolitan area to provide communication services. A cellular coverage pattern might be implemented such that a plurality of service areas substantially blanket a larger area, such as is shown and described in above referenced U.S. Pat. No. 6,016,313.

The configuration of communication hub 150 is adapted to optimize utilization of particular resources, such as communication hub 150 or portions thereof, by a plurality of nodes. For example, some elements of communication hub 150, such as multi-port modem 210, switch 261, and I/O 262, are utilized in providing communication to all nodes within service area 100. Moreover, some elements of communication hub 150, such as radio modules 221–224, are utilized in providing communication to a reduced set of nodes within service area 100, although use of even these components may be optimized to include use by multiple nodes (see e.g. radio module 221 in sector 101).

According to a preferred embodiment, the communication links between nodes 151–154 and communication hub 150 provide broadband data communication. Such communication may be relied upon to provide data communication of a particular quality and/or having a particular level of reliability, such as that commensurate with a SONET optical network. Accordingly, proper operation of the communication system may require particular levels of availability, reliability, and/or other operating parameters. However, the configuration of the communication system provides points of failure which may affect all or a substantial portion of the nodes. For example, multi-port modem 210 might fail causing a failure in all communication links between communication hub 150 and nodes 151–154, or radio module 221 might fail causing a failure in the communication links between communication hub 150 and nodes 152 and 153.

Accordingly, the present invention provides for adaptation of communication hub 150 to provide redundancy in the communication links. Specifically, in the preferred embodiment of FIG. 2, a redundant link portion of the system includes a communication signal processor, shown as protect modem 211, coupled to a communication interface module, shown as radio module 281. Radio module 281 provides communications within protect sector 201, which is preferably coextensive with one or more of sectors 101–104 providing primary communication. Accordingly, the antenna of radio module 281 of the illustrated embodiment is omnidirectional so as to provide a protect sector coextensive with each of sectors 101–104 to thereby provide redundancy for any links within these sectors. Such a redundancy configuration, utilizing a reduced amount of redundant components to provide redundancy for a larger number of primary components, is preferable in order to optimize utilization of the redundant link system portion. It should be appreciated that, as discussed in more detail below with respect to alternative embodiments of the present invention, other configurations of redundant link system components may be utilized according to the present invention, such as through the use of different configurations of antennas, different numbers and/or configurations of communication signal processors, etcetera. In a preferred embodiment, the primary sectors are 30° in azimuth and the protect sectors are 90° in azimuth. Moreover, as will be better appreciated from the discussion below, embodiments of the present invention utilize redundancy configurations which are adapted to accommodate the addition of bandwidth to the communication system while still providing adequate link redundancy.

Typically an antenna configuration providing a larger beam width, such as the increased angular view associated with radio module 281 as compared to that of radio modules 221–224, provides less signal gain. Accordingly, in a configuration wherein a protect sector is coextensive with a plurality of primary communication sectors the redundant link system portion may not experience signal attributes in all operating conditions identical to that of the primary system portions it is relied upon to backup. For example, expected rain densities and outage objectives may be utilized in setting a service area size of a particular primary sector. However, because of the lower gain of protect sector, which is coextensive with a plurality of such primary communication sectors, may be lower than that of the corresponding primary communication sectors, the protect sector may provide desired levels of signal quality only in clear and partial rain fades, although the primary sectors provide desired levels of signal quality throughout all levels of experienced rain fades.

It should be appreciated that the systems utilizing the present invention are expected to provide a very high level of reliability, such as on the order of operable within specifications 99.997% of the time, and are expected to be disposed in environments very rarely having sufficiently deep rain fades within a service area to result in undesired signal quality using a typical protect sector configuration, such as on the order of tolerable or no rain fades 99.995% of the time. Accordingly, it is expected that a situation wherein both a failure of primary link systems and the existence of a sufficiently deep rain fade to cause undesired operation will be rare. The rarity of the simultaneous occurrence of a primary system failure and a rain fade of sufficient magnitude combined with the preferred embodiment system configuration adapted for simplified failed component replacement, as described herein, provide a system in which reliable redundancy is provided in an economic implementation.

It is anticipated that the present invention will be utilized in communication systems which operate under control of an intelligent control system, such as is shown and described in the above referenced U.S. Pat. No. 6,016,313 and, therefore, the systems therein will be operable to accommodate these differences, such as through use of available resources, such as power level reserves which may be accessed through power control or other techniques. For example, in preferred embodiment millimeter wave data communication systems, sufficient transmission power levels are achievable to overcome substantial rain fades likely to be experienced in the propagation path. This available transmission power reserve may be relied upon to adjust for, or otherwise accommodate, the difference in gain experienced between a primary radio module more narrow beam antenna and a redundant radio module more wide beam antenna.

Of course, relying upon a transmission power level reserve, provided for use when rain fades are experienced, during times in which no rain fade is experienced may result in insufficient power level reserves being available when a rain fade is experienced. However, it is anticipated that the preferred embodiment use of this power level reserve in providing link redundancy will provide acceptable communication attributes as the likelihood of primary communication link system portion failure during a sufficiently deep rain fade to disrupt the redundant link is quite small. Moreover, preferred embodiments of the present invention utilize communication signal processors adjustable to accommodate signals of varying attributes, such as through the use of variable information densities as shown and described in the above referenced U.S. Pat. No. 6,016,313. Additionally or alternatively, preferred embodiments of the present invention are adapted to facilitate rapid repair/replacement of the communication system components through the use of field replaceable modules, as described in detail in the above referenced patent application entitled "System and Method for Providing a Communication System Configurable for Increased Capacity" and the above referenced U.S. Pat. No. 6,016,313, to further decrease the likelihood that the use of such reserve resources will coincide with an event for which they are otherwise required.

It should be appreciated that, although shown separated, the primary sectors and redundant sectors of the present invention are preferably substantially overlapping. Specifically, in order to provide redundant links in the service area, redundant sector 201 is preferably deployed in such a manner as to illuminate substantially the same area as those sectors for which the redundant sector is providing redundant links (here sectors 101–104). Accordingly, various subscriber units within redundant sector 201 may be provided redundant communication links through communication interface module 281 and communication signal processor 211. In operation according to the preferred embodiment, where a primary radio module fails, such as radio module 221, thus causing a communication failure in a portion of the communication system, such as between nodes 252 and 253 and communication hub 250, data associated with the failed links (data associated with nodes 252 and 253) may be redirected for communication through redundant radio module 281 and protect modem 211 from radio module 221 and multi-port modem 210.

According to a preferred embodiment, redundant radio module 281 utilizes a communication channel set different than that of one or more of primary radio modules 221–224 so as to allow simultaneous operation of radio module 281 and ones of radio modules 221–224 without substantial interference and/or without requiring substantial communication hub reconfiguration. For example, in the above example where radio module 221 has failed, the illustrated configuration of redundant radio module 281 provides for the signal of the redundant links of nodes 252 and 253 to be communicated in areas other than that of the failed radio module (here sectors 102–104 associated with still operating radio modules 222–224). Accordingly, the preferred embodiment utilizes a channel set at radio module 281 different than at least the channel set of the radio modules remaining functional. For example, where each of the sectors of service area 100 utilize a unique frequency channel or channels, possibly in combination with time division burst periods as shown and described in the above referenced patent application entitled "System and Method for Providing a Communication System Configurable for Increased Capacity," the redundant link portion of the communication system utilizes a different frequency channel or channels than the primary links remaining operational.

In one embodiment the channel set utilized at radio module 281 may be dynamically selected based upon the channel set of a failed radio module or the channels set or sets of the functional radio modules. For example, the channel set of failed radio module 221 may be adopted by a channel agile radio module 281 to avoid the necessity of any of nodes 252 and 253 to adjust their operation in response to the failure. Alternatively, the channel set of redundant radio module 281 may be dynamically adapted to be a channel set different than that of the operational radio modules, without reference to the channel set of the failed radio module.

However, the most preferred embodiment utilizes a channel set at the redundant radio module unique from the channel sets of each of the primary radio modules for which the redundant radio module is providing backup protection. Such an embodiment may be preferred, for example, in situations where communication hub 150 is a part of a communication network utilizing a frequency reuse plan because the larger angular coverage associated with redundant radio module 281 is likely to cause undesired interference in sectors of other service areas of the network where the channel set of the failed radio module is reused. Channel reuse techniques suitable for providing such unique channel sets are shown and described in the above referenced patent application entitled "Frequency Reuse for TDD." Preferred embodiments of the present invention utilize unique channel sets for the redundant links and channel agile nodes operable to adjust to these channel sets upon failure of a primary link associated therewith. For example, nodes 152 and 153 may be operating at a frequency F1 wherein node 152 is assigned time slot TS1 and node 153 is assigned time slot TS2, where perhaps node 154 although operating at frequency F2 is assigned time slot TS3 and node 151 although operating at frequency F4 is assigned time slot TS4. Control algorithms operable at nodes 152 and 153 may detect a link failure, such as by a loss of communication for a predetermined amount of time, a bit error rate exceeding a predetermined threshold, a signal to noise or carrier to interference ratio falling below a predetermined threshold, and/or the like, and thereafter adjust the channel utilized thereat to a unique redundant link channel, such as frequency F5, and thereby establish communications through a redundant link of the present invention. Control algorithms at the hub may detect the failure of the primary link, squelch the primary radio transmissions, and reroute data to the appropriate redundant link components.

It should be appreciated that use of this unique channel set provides freedom with respect to other channel aspects of the redundant link. For example, node 152 may continue to utilize a time slot of the new frequency consistent with that of TS2 and, likewise, node 153 may continue to utilize a time slot of the new frequency consistent with that of TS3. Accordingly, timing attributes, such as may be important with respect to operation of the communication hub and the unaltered nodes, may be maintained. Alternatively, the freedom associated with the unique channel may be utilized to establish a different timing sequence or other communication attribute in the redundant links, such as may be useful in using the redundant link system portion in providing increased bandwidth (communication capacity) on demand.

Another advantage of the unique channel set utilized in the redundant links of the illustrated embodiment is realized in the ability to provide redundant links for multiple ones of the primary sectors simultaneously. For example, if both radio module 221 and radio module 224 were to experience a failure simultaneously or if multi-port modem 210 was to fail, redundant radio module 281 may be relied upon to establish redundant links with nodes disposed in different primary sectors simultaneously by simply having any or all affected nodes adopt the appropriate channel set. However, it should be appreciated that, with the exception of a common component experiencing failure or malfunction, such as multi-port modem 210, it is not expected that multiple ones of the primary sectors will typically experience simultaneous failure due to the reliability levels generally required of high bandwidth components to be deployed in such a communication system.

In the embodiment illustrated in FIG. 2, the redundant link portion of the communication system provides communication capacity substantially equivalent to that of all the primary sectors for which redundancy is provided combined. Specifically, protect modem 211 provides for communication capacity similar to that of multi-port modem 210, irrespective of the disparity in number of sectors served. However, preferred embodiments of the present invention utilize a communication hub configuration adapted to provide substantially more bandwidth (communication capacity) in the primary communication links which are backed up by a particular redundant link portion of the system than that of the embodiment of FIG. 2. The redundant link communication system portions of the present invention provide redundancy substantially as described above for these alternative embodiments, but with the added benefit of providing more economical redundancy through relying upon redundant capacity equivalent to a subset of primary links to provide redundancy for a larger number of primary links.

Figure 3:
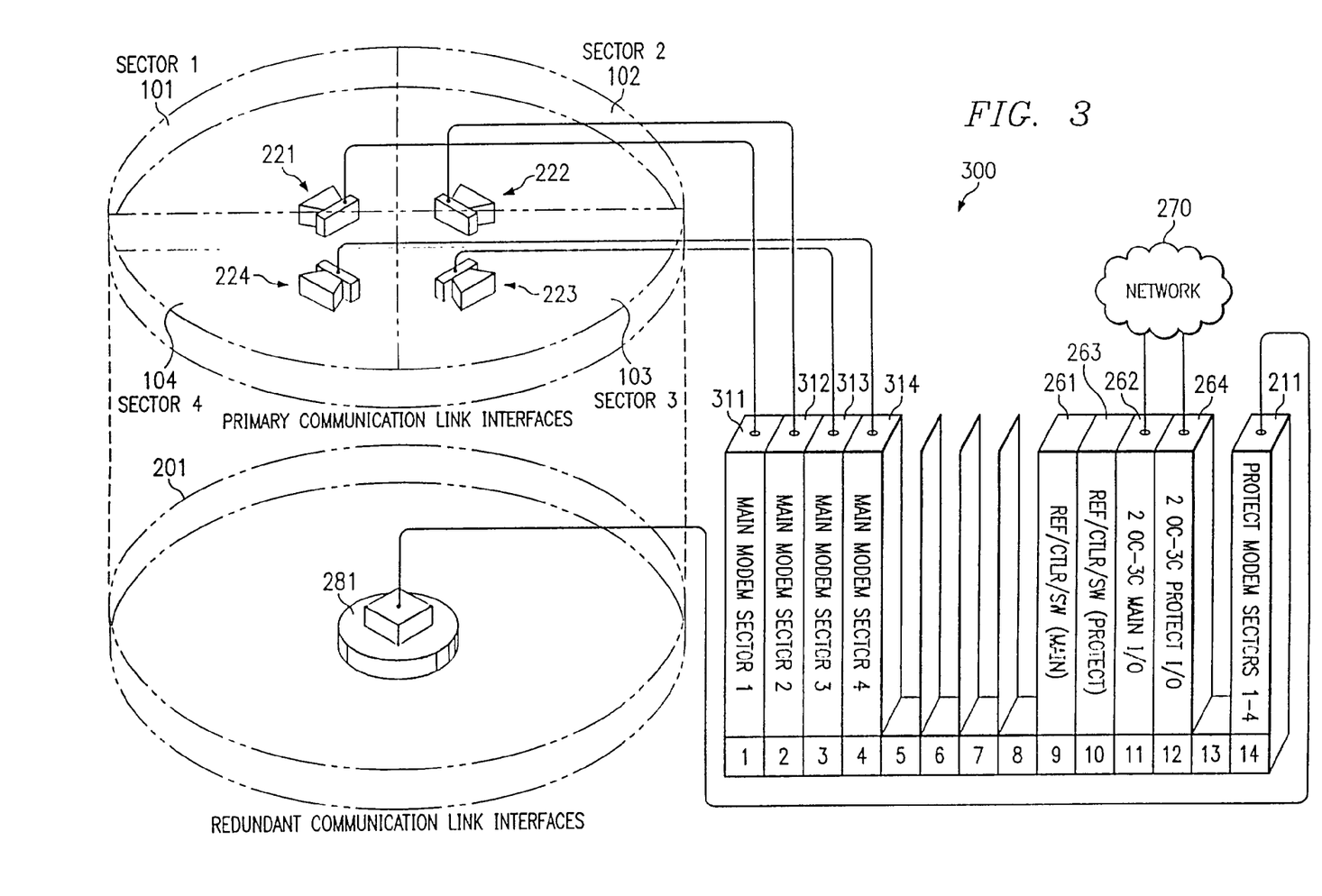
FIG. 3 shows the communication hub of FIG. 2 modified to provide additional capacity in the primary links while continuing to rely upon the link redundancy configuration of the embodiment of FIG. 2.

Directing attention to FIG. 3, an alternative embodiment communication hub 150 is shown generally as communication system 300 wherein increased bandwidth or data capacity is provided within service area 100 through providing each of radio modules 221–224 with an associated modem 311–314 respectively. In the embodiment of FIG. 3 each of modems 311–314 provide a same data capacity as that of multi-port modem 210. Accordingly, the alternative embodiment of FIG. 3 may theoretically be relied upon to provide four times the data communication bandwidth as that of the embodiment of FIG. 2.

However, it should be appreciated that the embodiment of FIG. 3 utilizes the same redundant link components as that of the embodiment of FIG. 2. Accordingly, a single modem 211 and radio module 281, having a substantially same data capacity as any one of modem 311 and radio module 221, modem 312 and radio module 222, modem 313 and radio module 223, and modem 314 and radio module 224, are relied upon in the alternative embodiment of FIG. 3 to provide redundant links for primary links which in aggregate provide considerably more bandwidth or data capacity.

However, as discussed above, equipment failure leading to primary links in more than one primary sector simultaneously is expected to be rare. Accordingly, the use of the redundant link portion of the system is optimized in the embodiment of FIG. 3. Specifically, it is expected that the redundant links will remain idle a substantial amount of the time. However, if a communication system is to include redundant links for reliability purposes, it is typically advantageous to provide such redundant links for each primary link. The configuration of FIG. 3 provides a redundant link portion of the system for each of the independent sectors, but by sharing this redundant equipment across multiple independent primary portions, the expected idle time of the redundant equipment may be reduced or minimized for a more optimum utilization of such equipment.

It should be appreciated that the embodiment of the redundant link portion of the system shown in FIGS. 2 and 3 is merely illustrative of configurations which may be utilized according to the present invention. For example, there is no limitation that a redundant link portion of the system provide redundancy for an entire service area. Additionally or alternatively there is no limitation that a redundant link portion of the system utilize an omnidirectional, or any other configuration, antenna system.

Figure 4:
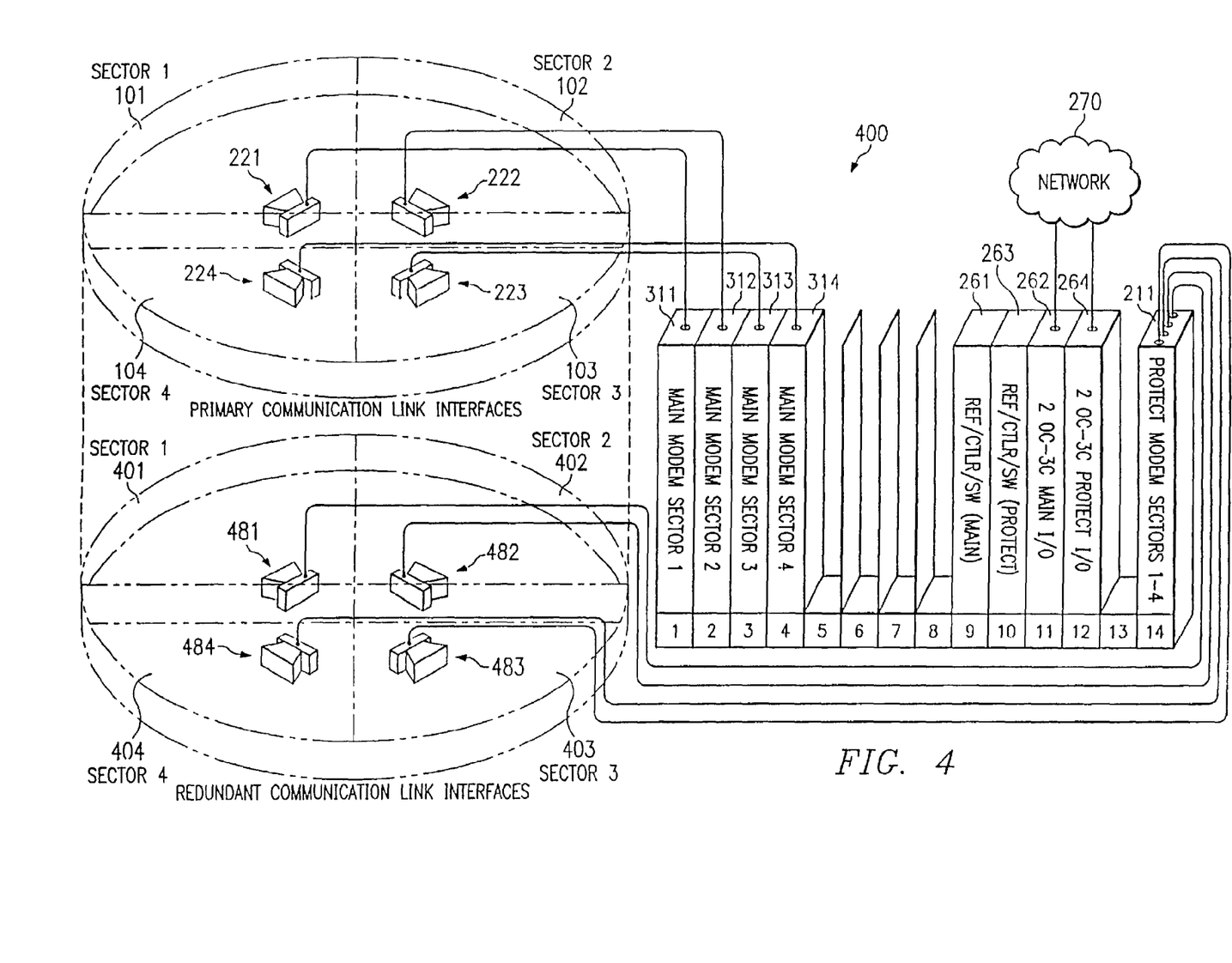
FIG. 4 shows a communication hub adapted to provide link redundancy according to an embodiment of the present invention.

Directing attention to FIG. 4, an embodiment wherein communication hub 150 adapted to establish communications within service area 100 is shown generally as communication system 400. In the illustrated embodiment of FIG. 4, communication hub 150 includes a plurality of primary communication link communication signal processors, shown as modems 311–314, coupled to a plurality of communication interface modules, shown as radio modules 221–224, configured as shown in the embodiment of FIG. 3. Radio modules 221–224 provide communications within sectors 101–104 respectively.

In the embodiment of FIG. 4, the redundant link portion of the system includes a communication signal processor, shown as protect modem 211, coupled to a plurality of communication interface modules, shown as radio modules 481–484. Radio modules 481–484 provide communications within protect sectors 401–404 respectively. Preferably, protect sectors 401–404 are each coextensive with one or more of sectors 101–104 providing primary communication. The embodiment of the redundant link portion of the system of FIG. 4 may be a subsequent modification to the embodiment shown in FIGS. 2 and 3, such as where communication conditions require improved signal attributes, or may be an initially deployed configuration.

It should be appreciated that the configuration of the embodiment of FIG. 4 provides several advantages over that of that of FIGS. 2 and 3. For example, radio module 281 of FIGS. 2 and 3, presenting a single point of failure with respect to the redundant links, has been replaced in favor of a plurality of radio modules 481–484. Accordingly, it is expected that the embodiment of FIG. 4 may provide a higher level of redundancy reliability, although at the cost of the added redundant components.

Moreover, there are additional benefits derived from the plurality of radio modules of the embodiment of FIG. 4 which may further justify any increased costs associated therewith. Specifically, the antenna beams of the plurality of radio modules 481–484 are more narrow than that of radio module 281. As discussed above, an antenna configuration providing a more narrow beam width, such as the decreased angular view associated with radio modules 481–484 as compared to that of radio module 281, typically provides increased signal gain. Accordingly, in the configuration of FIG. 4, improved redundant link signal quality might be expected, and therefore less reliance upon communication system reserve attributes, such as the aforementioned power level reserve, may be expected in such an embodiment. For example, in the embodiment of FIG. 4, as the primary and redundant sectors are correspondingly substantially coextensive, operation of the redundant link portion of the system to provide redundant links may require reliance upon communication system reserve attributes.

Moreover, even where the primary sectors and the redundant sectors are not substantially coextensive, the improved gain and/or signal quality which might be expected from this embodiment of the redundant links may be relied upon to reduce reliance upon communication system reserve attributes in establishing and/or maintaining redundant links. For example, increased bandwidth or data capacity may be provided at communication hub 150, such as is shown and described in the above referenced patent application entitled "System and Method for Providing a Communication System Configurable for Increased Capacity," whereby ones of the primary sectors are divided into smaller or subsectors as shown in the alternative embodiment of FIG. 5.

Figure 5:
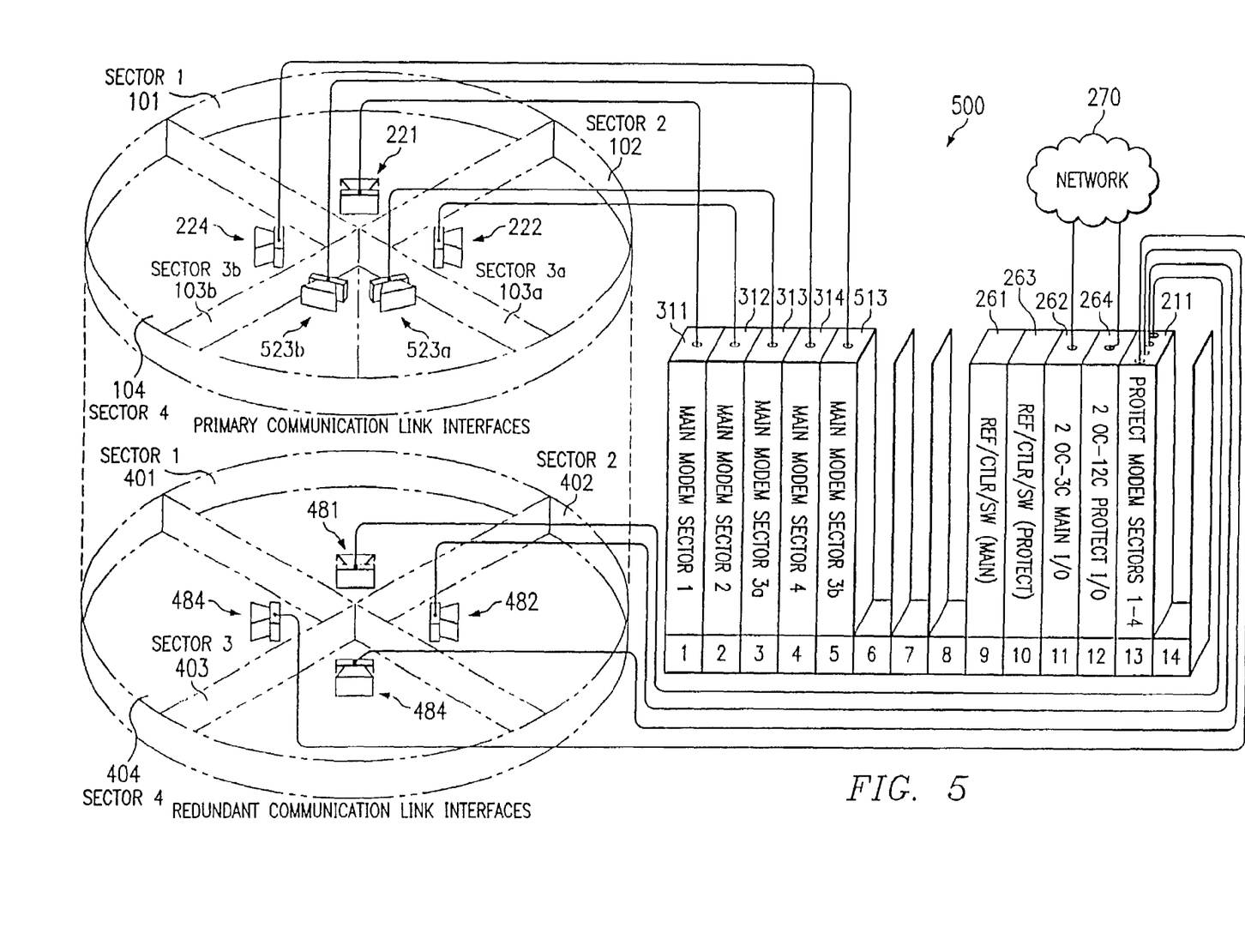
FIG. 5 shows the communication hub of FIG. 4 modified to provide additional capacity in the primary links while continuing to rely upon the link redundancy configuration of the embodiment of FIG. 4.

Referring to FIG. 5, communication hub 150 has been adapted into communication system 500 to include two subsectors, subsectors 103a and 103b, within the area of sector 103 of the configuration of FIG. 4. This is preferably accomplished through the replacing of radio module 223 with radio modules 523a and 523b having more narrow antenna beams associated therewith. Specifically, in the embodiment shown in FIG. 5, the substantially 90° sector of radio module 223 has been replaced by the substantially 45° sectors of radio modules 523a and 523b. Such an alteration to the system of FIG. 4 may be made to provide increased capacity, such as may be associated with the addition of an additional signal processor, shown here as modem 513.

It should be appreciated that, as with the configurations of FIGS. 2 and 3, a protect sector is relied upon to provide redundant links for more than one primary sector. Specifically, radio module 483 is relied upon in the embodiment of FIG. 5 to provide redundant links for any nodes in primary sectors 103a and 103b.

Although a single redundant signal processor, protect modem 211, is relied upon in the embodiment of FIG. 5 to provide redundant links for all of service area 100, it should be appreciated that there is no such limitation of the present invention. For example, a second protect mode (not shown) may be deployed in the bus structure of the illustrated embodiment of communication hub 150 to provide added redundant link capacity. In such an embodiment one or more of the radio modules, and therefore their associated protect sectors, may be decoupled from the first protect modem (protect modem 211) and coupled to the newly added protect modem or modems (not shown). Additionally, or alternatively, ones of the redundant radio modules may be replaced by radio modules having smaller beam widths, as shown above with respect to the subsectors of FIG. 5, in order to distribute redundant link data loading, such as between multiple redundant link modems. Accordingly, substantially independent redundant link portions of the system may be provided with respect to ones of the primary sectors.

It should be appreciated that the present invention is not limited to providing redundancy in the 90° and 45° primary sectors shown in the preferred embodiments. Likewise, redundant links are not limited to being provided in the omnidirectional and 90° redundant sectors shown. Accordingly, any sector size may be utilized according to the present invention. Moreover, there is no limitation of the present invention requiring symmetry in sector sizes, whether primary or redundant. For example, various different primary sector sizes may be provided redundancy by a particular redundant sector. Additionally or alternatively, various different redundant sector sizes may be utilized in the provision of redundancy according to the present invention. Moreover, the present invention is not limited to use in a sectorized system and, therefore, may be used in any system providing a plurality of links which may benefit from redundancy.

In order to provide the logical management of the physical virtual sector and network trunk tables, the network convergence database groups modems logically so that a group of remote paths may be logically moved without a consequent recoding of hard-coded tables and records or rewriting of software.

Figure 6:
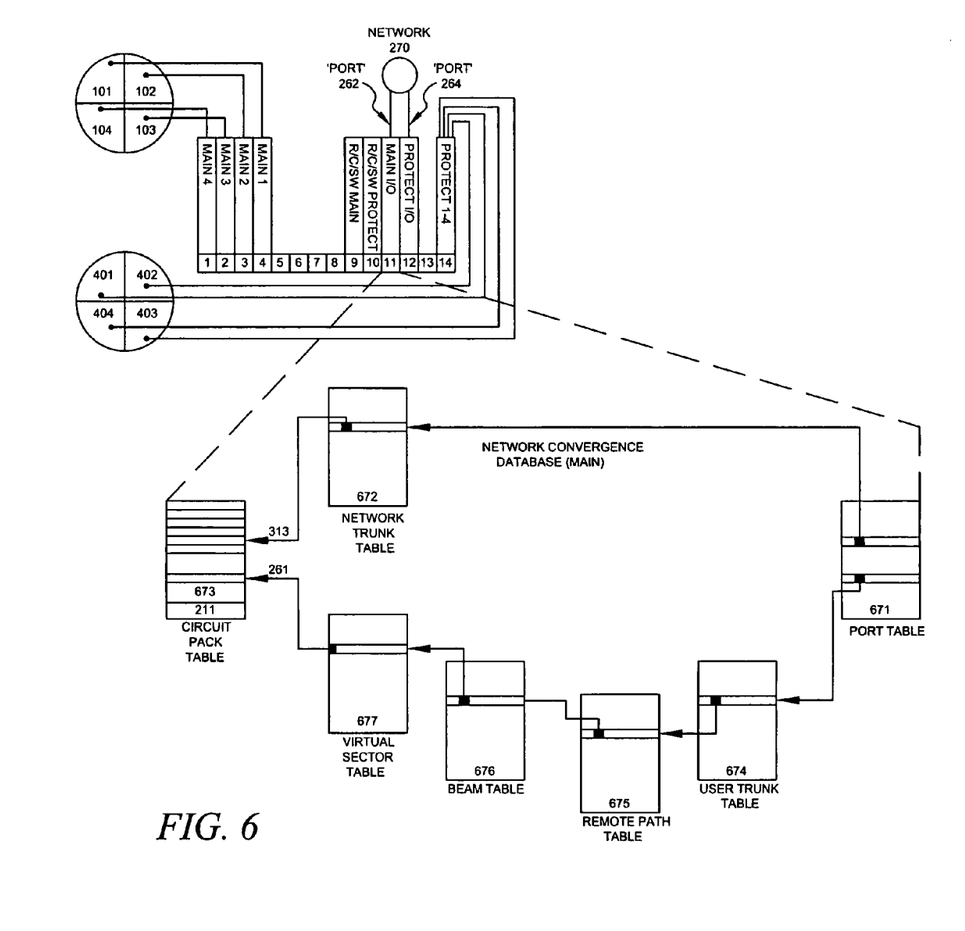
FIG. 6 shows the a portion of the Network convergence Database with a look up tables according to an embodiment of the present invention.

Directing attention to FIG. 6, a point to multipoint communication system with a hub, plurality of nodes geographically spaced apart from the hub in wireless communications is shown, wherein the embodied links between the nodes and the hub are separated by trunk type and are capable of being separated by path, beam or virtual sector. In the illustrated embodiment of FIG. 6, the portion of the network convergence database is comprised of a port table based on port type (network trunk table referenced or virtual trunk table referenced), a network trunk communications table and a virtual sector communications table comprised of a separate virtual sector table, beam table, remote path table, and user trunk table.

Various look up table as shown in FIG. 6 as tables 671–677 functions may be provided to direct communication signals through radio input/output module 262. Depending on the output of the signal processor the incoming signal will be directed through either the network trunk communications path or the virtual sector trunk communications path. Once the radio signal is directed to table 672 from port table 671, the network trunk table will direct the signal to the appropriate slot identification reference or signal connector identification reference in the circuit pack table 673. Wherein after slot identification and card identification, the signal is directed from the circuit pack table 673 to the appropriate modem. As a consequence of the signal processor directing the radio signal to the virtual sector trunk communications path, the port table 671 will direct the radio signal to the user trunk table 674 wherein the table will reference the appropriate remote path and customer premise equipment connector and direct the signal to the corresponding remote path table 675. Upon receipt of the directed signal from the user trunk table 674, the remote path table 675 will reference the apposite beam table and direct the radio signal thus to the beam table 676. Upon receipt of the radio signal from the remote path table 675, the beam table 676 will note the relevant virtual sector table and radio port and will subsequently direct the radio signal to the virtual sector table 677. Upon receipt of the radio signal from the beam table 676, the virtual sector table will reference the appropriate slot identification and direct the radio signal to the corresponding slot identification reference in the circuit pack table 673. The circuit path table 673 will then direct the radio signal to the relevant modem. As a consequence of this division of look up tables between network trunk and virtual sector trunk tables, a processor failure or maintenance or diagnostic evolution whether routine or emergency will not result in unnecessary or excessive maintenance and repair thus reducing relevant sector downtime and repair costs.

This portion of the aforementioned communications system functions as a network convergence grouping mechanism whose primary purpose is to logically group modems so that a group of remote paths may be logically moved without rewriting the embedded software or recoding the hard-coded tables and records. The tables preferable are implemented with table agent object, (which can be instances of C++ programming) that reside on the tables and facilitate the information retrieval.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A point to multipoint communication system with a hub, a plurality of nodes geographically spaced apart from the hub and capable of wireless communication with the hub, wherein communication links between the nodes and the hub are a plurality of port to port connections distinguished by trunk type and are capable of being distinguished by path, beam or virtual sector, the improvement comprising a plurality of hierarchically arranged look up tables relating entries in port slots to entries in circuit pack slots;
   wherein the plural look up tables correspond port table entries to trunk type, trunk type to path, path to beam, beam to virtual sector and virtual sector to circuit pack table entries.

2. The communication system of claim 1, wherein one of the plural look up tables correspond network trunk ports to circuit pack ports.

3. The communication system of claim 1, wherein the plurality of look up tables are individually reconfigurable.

4. The communication system of claim 1, wherein said communications system operates in the millimeter wave frequency.

5. The communication system of claim 4, wherein said communications system is a time division duplex system.

6. The communication system of claim 5, wherein said communications system is an adaptive time division duplex system.

7. The communication system of claim 6, wherein the data density within each frame is dynamically variable.

8. The communication system of claim 6, wherein the adaptive time division duplexing is dynamically adjustable as a function of the forward and reverse data traffic on the communication system.

9. The communication system of claim 1, wherein said look up tables are adapted to facilitate rapid field replacement.

10. In a point to multipoint communication system with a hub, a plurality of nodes geographically spaced apart from the hub and capable of wireless communication with the hub, wherein communication links between the nodes and the hub are a plurality of port to port connections distinguished by trunk type and are capable of being distinguished by path, beam or virtual sector, a method of establishing a port to port connection, the improvement comprising the step of using a plurality of look up tables heirarchically arranged to relate entries in port slots to entries in circuit pack slots;
   wherein the plural look up tables correspond port table entries to trunk type, trunk type to path, path to beam, beam to virtual sector and virtual sector to circuit pack table entries.

11. The method of claim 10, wherein one of the plural look up tables correspond network trunk ports to circuit pack ports.

12. The method of claim 10, wherein the plurality of look up tables are individually reconfigurable.

13. The method of claim 10, wherein said communications system operates in the millimeter wave frequency.

14. The method of claim 13, wherein said communication system is a time division duplex system.

15. The method of claim 14, wherein said communication system is an adaptive time division duplex system.

16. The method of claim 15, wherein the data density within each frame is dynamically variable.

17. The method of claim 15, wherein the adaptive time division duplexing is dynamically adjustable as a function of the forward and reverse data traffic on the communication system.

18. The method of claim 10, wherein said look up tables are adapted to facilitate rapid field replacement.

* * * * *